United States Patent [19]

Gmuer

[11] Patent Number: 5,150,758
[45] Date of Patent: Sep. 29, 1992

[54] ROTARY RECEPTACLE SCALE

[75] Inventor: Bruno Gmuer, St. Gallen, Switzerland

[73] Assignee: Buehler AG, Uzwil, Switzerland

[21] Appl. No.: 598,691

[22] PCT Filed: Feb. 26, 1990

[86] PCT No.: PCT/CH90/00042
§ 371 Date: Oct. 24, 1990
§ 102(e) Date: Oct. 24, 1990

[87] PCT Pub. No.: WO90/11496
PCT Pub. Date: Oct. 4, 1990

[30] Foreign Application Priority Data

Mar. 17, 1989 [CH] Switzerland .................. 01000/89

[51] Int. Cl.⁵ .................. G01G 13/22; G01G 23/14; G01F 11/10
[52] U.S. Cl. .................. 177/84; 177/165; 222/368
[58] Field of Search .................. 177/83–88, 177/165, 91; 222/368

[56] References Cited

U.S. PATENT DOCUMENTS

| 1,658,943 | 2/1928 | Ruppert | 177/83 |
| 1,755,154 | 4/1930 | Smith et al. | 177/83 |
| 2,772,818 | 12/1956 | McLauchlen | 222/368 |
| 4,602,727 | 7/1986 | Jackson | 222/368 |
| 4,627,506 | 12/1986 | Veng . | |
| 4,682,915 | 7/1987 | Hafner | 177/59 X |
| 4,823,993 | 4/1989 | Siegel et al. | 222/368 X |
| 4,976,378 | 12/1990 | Bush | 177/83 X |

Primary Examiner—George H. Miller, Jr.
Attorney, Agent, or Firm—McAulay Fisher Nissen Goldberg & Kiel

[57] ABSTRACT

The new invention proposes a rotary receptacle scale, wherein the weighing receptacle 2 is moved with a rotating drive by 180° from the filling position into the emptying position. The weighing receptacle 2 is enclosed by a casing 1. The weighing receptacle 2 and the casing 1 are constructed in a manner similar to a lock rotor and lock wheel housing with respect to the movement function. The receptacle scale itself accordingly corresponds to increased hygienic requirements and can also be provided with a pressure-resistant casing at low cost.

10 Claims, 4 Drawing Sheets

ROTARY RECEPTACLE SCALE

FIELD OF THE PRESENT INVENTION

The invention is directed to a rotary receptacle scale comprising a cup receptacle and mechanical positive guidance means for the movement of the weighing receptacle in a casing from a filling position to an emptying position.

BACKGROUND ART

The French patent FR-PS 1 131 825 shows an automatic scale as has been used for many decades in the cereals processing industry for control purposes and for controlling the product flow. It concerns an automatic operation within the framework of the classical weighing technology. A scale pan is filled with product, the weight of the full scale pan is determined after a short settling time, the scale pan is tipped, emptied out and returned to the filling position. The tare weight can be determined at least when weighing for the first time and the weighed bulk product can be calculated. The tare weight is compensated for in many cases, so that the precise weight of every fill can be determined every time in a desired repetition. A determined weight can thus also be preadjusted with corresponding control of metering devices, so that an identical weight, e.g. 50 kg, is delivered with every weighing. This is periodically checked in the case of scales which are subject to weights and measures regulations.

The real disadvantage of this scale system, which is still widespread, consists in that the construction cost is approximately equally high in every case almost regardless of the magnitude of the scale, e.g. in the area of a scale pan content of 5 to 100 kg. Thus, a smaller scale can not be produced very inexpensively. Another disadvantage is the relatively complicated mechanical construction. The cleaning is impeded although there is a particularly large number of locations on the mechanism in which dust can settle. At present, in foodstuffs processing operations, strict demands are placed on hygiene. A complete encasing protects the mechanism from external influences, but creates dead spaces in the interior in which product deposits can remain until the foodstuffs or feedstuffs spoil.

The DDR patent 12 969 shows an automatic scale without housing which comprises a rotatably supported load drum. The weighing receptacle is constructed as a round drum and allows a very rapid rotation. The construction without housing shown in the DDR patent 12 969 would not be suitable for products giving off great quantities of dust, such as flour or feedstuffs components, or additional devices would have to be arranged for keeping the surroundings free of dust.

SUMMARY OF THE INVENTION

The invention has as an object the developing a rotary receptacle scale with means of simple construction, i.e. also inexpensively, which allows optimum operation with respect to hygiene.

The solution, according to the object, is characterized in that the weighing receptacle and the casing are constructed in the manner of a rotary lock (similar to a lock rotor and lock wheel housing), wherein the weighing receptacle preferably comprises a horizontally extending axis of rotation.

In contrast to a rotary lock, in which the lock rotor continuously executes complete rotational movements, the weighing receptacle only needs a rotation of 180° from the filling position to the emptying position. The most simple, inexpensive, commercially available elements for the positive guidance movement of the cup receptacle are sufficient for ensuring this function. The movement of the weighing receptacle in the housing, which is conceived in the manner of a lock, and in the casing, respectively, has a self-cleaning action with every weighing process. But the object proposed by the invention has accordingly been successfully met in a very advantageous manner with a minimum of individual elements and structural component parts and simple construction shapes.

The invention further allows a number of particularly advantageous constructions.

Thus, the cup preferably has a rotationally cylindrical shape in the opening area with respect to the center of rotation of the receptacle. The outer cup rim accordingly wipes the area of the housing near the wall and keeps it clean in the manner of the wing extremities of a lock rotor. In the same way, the base of the cup receptacle has a cylindrical shape.

Depending on the type of products to be weighed, the lateral defining walls of the cup receptacle are constructed at a slight distance parallel to the lateral walls of the casing, or the cup receptacle has a cylindrical shape in cross section.

Further, the mechanical positive guidance means preferably comprise a pneumatically actuable rotary drive for rotating the weighing receptacle by 180°.

Further, a decisive advantage consists in that the casing is constructed so as to be resistant to pressure and/or the flange faces are of the same dimensions at the top and bottom, so that the weighing can take place in pressure above atmosphere, as well as in a vacuum.

A very interesting step with respect to keeping the inner surfaces of the scale clean is provided by the use of a cleaning wiping device. A cleaning action of virtually 100 per cent in the narrow intermediate spaces which are particularly difficult to reach in manual cleaning can be achieved by means of correspondingly deliberate shaping of the weighing receptacle and the housing wall surfaces. The cleaning device is preferably produced as simple wipers of elastic materials. When requirements are stricter, it can be formed from materials with favorable sliding properties, such as bronze or graphite. It is also important that wipers be assigned which are adapted to the respective shape and base surface and side surfaces.

In a very advantageous construction, the weighing receptacle is suspended over weight elements together with the casing.

The tare weight of the weighing receptacle as well as the casing can be compensated for via a lever system with a counterweight when very high accuracy is demanded and for very small filling weight in the weighing receptacle.

For a better understanding of the present invention, reference is made to the following description and accompanying drawings while the scope of the invention will be pointed out in the appended claims.

DESCRIPTION OF THE PREFERRED EMBODIMENTS

Figure 1:
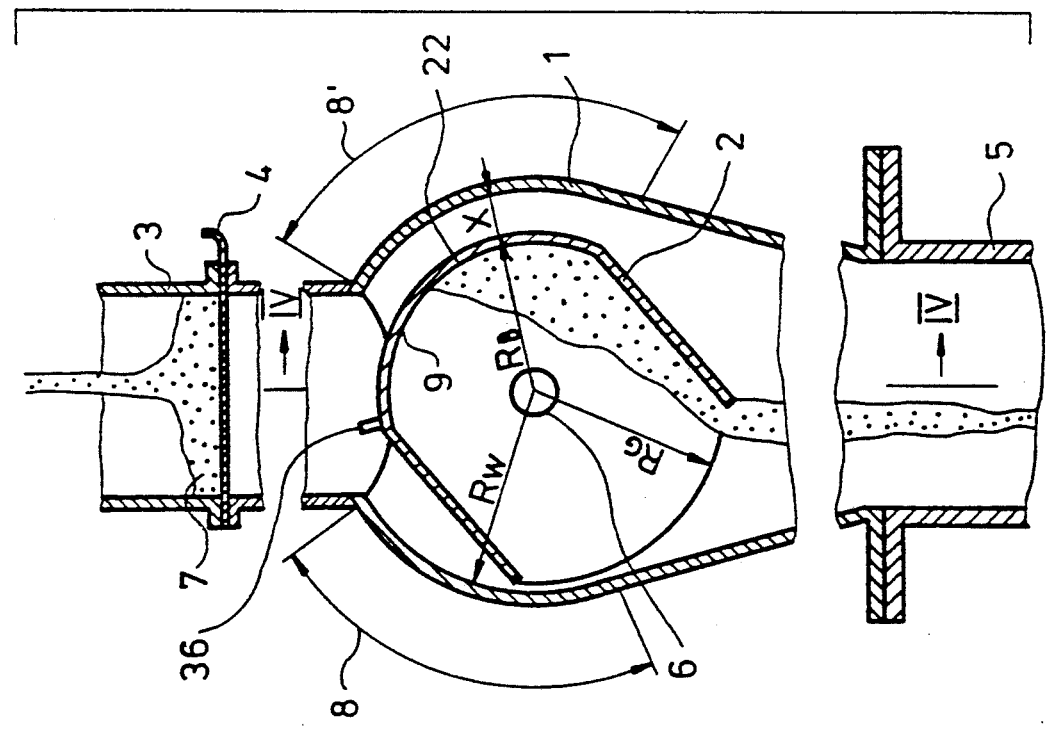
FIG. 1 shows a basic cross section through the rotary receptacle scale.

The rotary receptacle scale is shown in FIG. 1 at the commencement of emptying. The rotary receptacle scale comprises the following main elements: a casing 1, a weighing receptacle 2, a product feed 3, a feed slide 4, and a product discharge duct 5. The weighing receptacle 2 is supported at a horizontal axle 6. The classical method of batch weighing is preferably used. From the commencement of weighing, the product feed is interrupted, which is illustrated by the feed slide 4 shown in the closed position and the product piles 7 lying above the latter. The casing 1 comprises two lateral portions 8 and 8' with cylindrical shape. The wall portion 8 and 8', respectively, has an inner radius RW which is greater than the radius RG of the outer enveloping edge of the open part of the weighing receptacle 2 only by a small extent. The base 22 of the weighing receptacle 2 preferably has a radius RB which is smaller by a measurement "X". A wiper 36 is arranged in the corresponding intermediate space, wherein this wiper 36 makes use of the rotating movement of the weighing receptacle for its operation. It is possible to design the control in such a way that a rotating movement is carried out in both directions alternately, so that all surfaces are cleaned.

Figure 2:
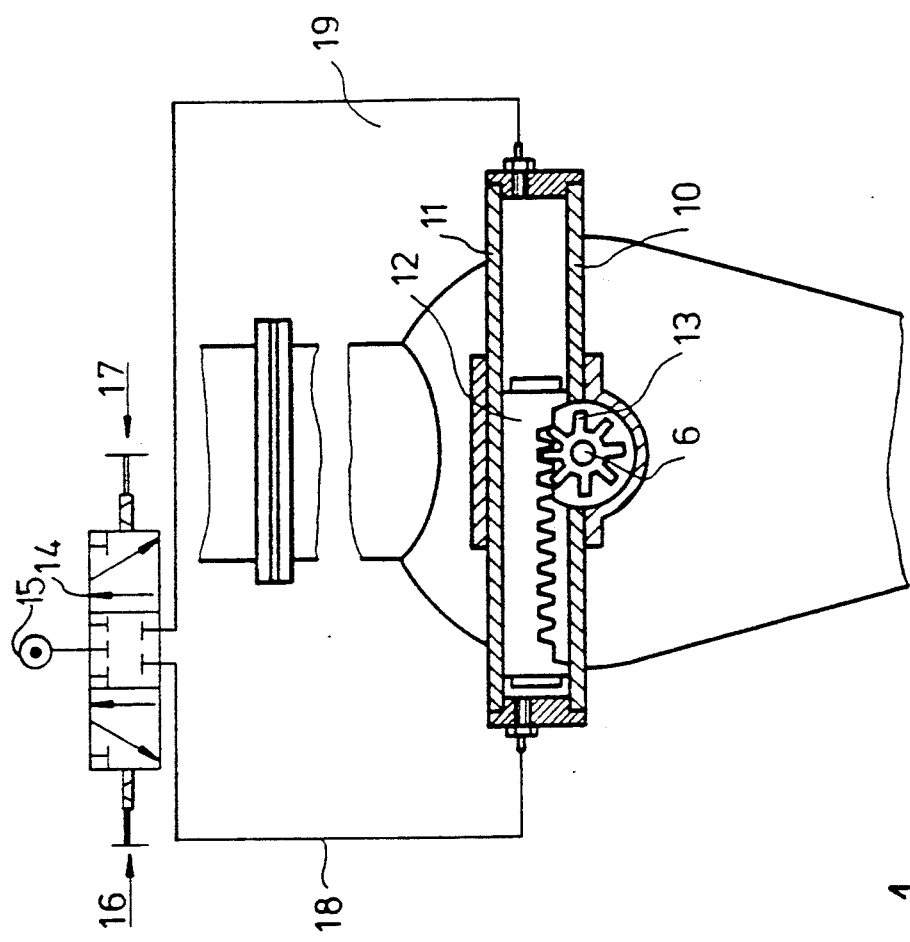
FIG. 2 shows a schematic view of the drive for the movement of the weighing receptacle.

A drive 10 for the rotating movement of the weighing receptacle 2 is shown in FIG. 2. The drive 10 comprises a pneumatic cylinder 11 as well as a toothed piston 12 which rotates the axle 6 via a toothed pinion 13. The movement of the toothed piston 12 is controlled by a pneumatic valve 14. The valve has a compressed air connection 15, shown schematically, wherein the movement of the weighing receptacle 2 is secured optionally by means of actuating the tappet 16 and 17, respectively, via pressure lines 18 and 19, respectively.

Figure 3A:
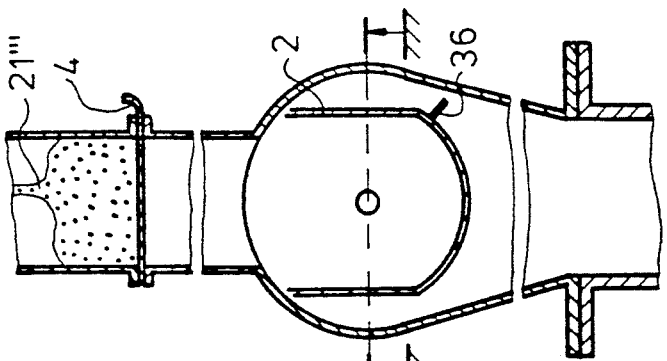
FIGS. 3a–3e show different positions of the weighing receptacle for a single weighing.
Figure 3B:
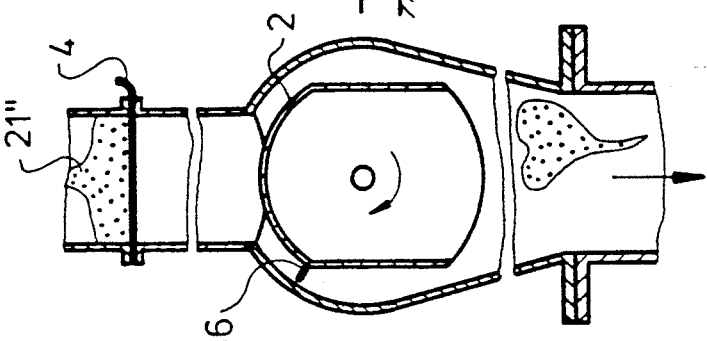
Figure 3C:
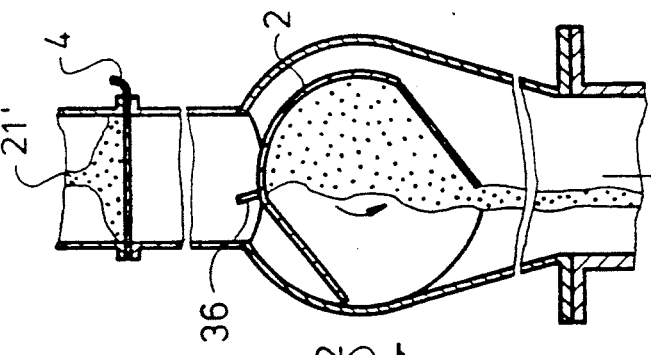
Figure 3D:
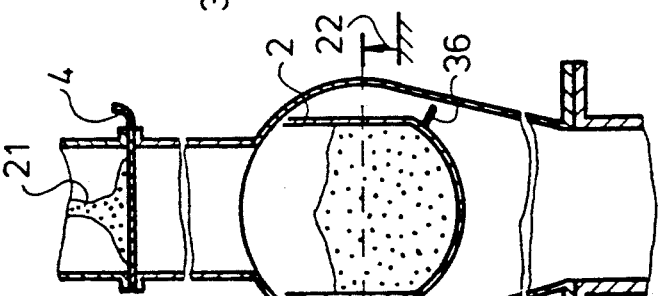
Figure 3E:
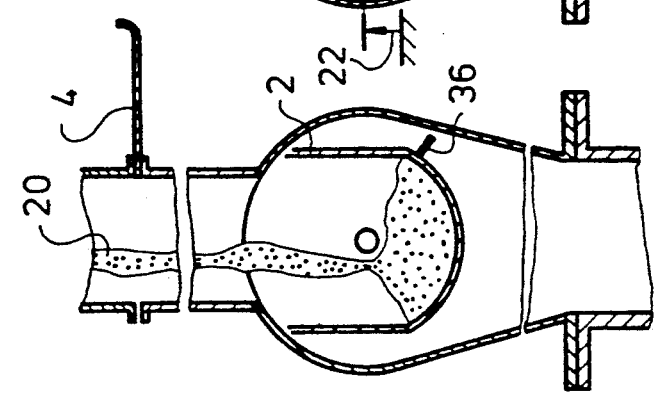

Various positions of the weighing receptacle 2 are shown in FIGS. 3a to 3e. The feed slide 4 is in the open position in FIG. 3a. The bulk product 20 flows directly into the weighing receptacle 2. Depending on the type of weighing problem, e.g. with known flow-in quantities, the feed slide 4 can remain open for a predetermined period of time. In FIG. 3b, the product feed into the weighing receptacle 2 is interrupted. The product 21 piles up on the feed slide 4. After the required settling time, the weighing receptacle 2, together with the contents, is weighed by means of corresponding weight measuring elements 22. The contents of the weighing receptacle 2 are then emptied, as is shown in FIG. 3c, and the completely emptied weighing receptacle 2 is rotated back into the filling position again (FIG. 3d). Before a new weighing cycle can begin, the empty weight of the weighing receptacle 2 is determined and the actual weight of a fill is calculated from the difference "full weight minus empty weight" (FIG. 3e). A second weighing cycle 3a to 3e can commence. The product 21 - 21" can accumulate over the feed slide 4 during the different weighing phases 3b to 3e.

Figure 4:
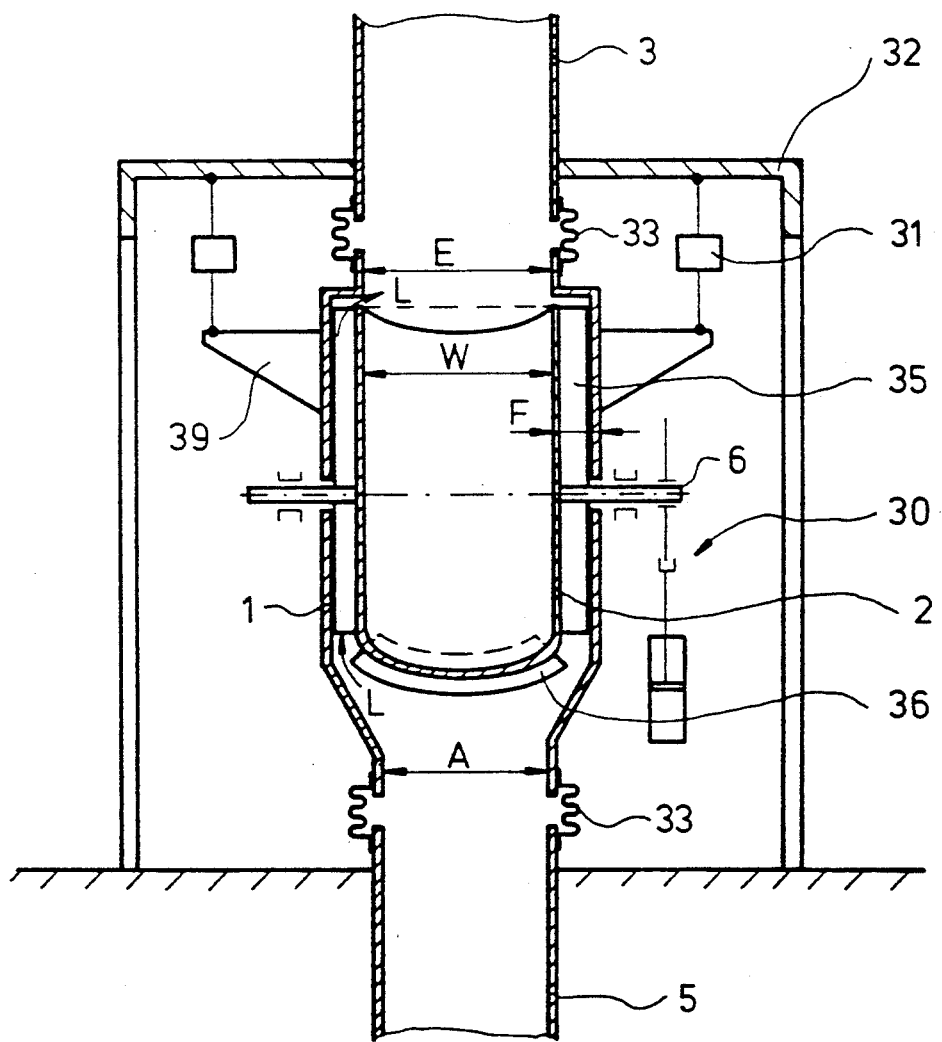
FIG. 4 shows a section IV—IV of FIG. 1.

FIG. 4 is analogous to FIG. 1 and is shown as a section IV—IV of FIG. 1. The weighing receptacle 2, together with the casing 1, forms a weighing unit 30. The weighing unit 30 is suspended over weight measuring elements 31 at a stationary stand 32. The product feed 3 and the product discharge duct 5 are likewise connected with the stationary structural component parts. A flexible sleeve 33 is arranged between the weighing unit 30 and the stationary structural component parts at the inlet side and the outlet side in both instances.

A very interesting construction idea consists in making the free cross section E in the area of the product feed 3 and the free cross section A in the area of the product discharge duct 5 the same size. A sufficient distance of e.g. a finger breadth, is provided between the outer wall of the weighing receptacle 2 and the casing 1, so that a throughflow duct L is formed for a continuous pressure compensation between the upper side and the lower side of the weighing receptacle 2. A wiper 35 is preferably arranged at the weighing receptacle 2 and a wiper 36 is arranged in the rounded base portion, so that at least the wall parts with very poor access are accordingly cleaned with the rotating movement of the weighing receptacle 2 in normal operation.

Figure 5:
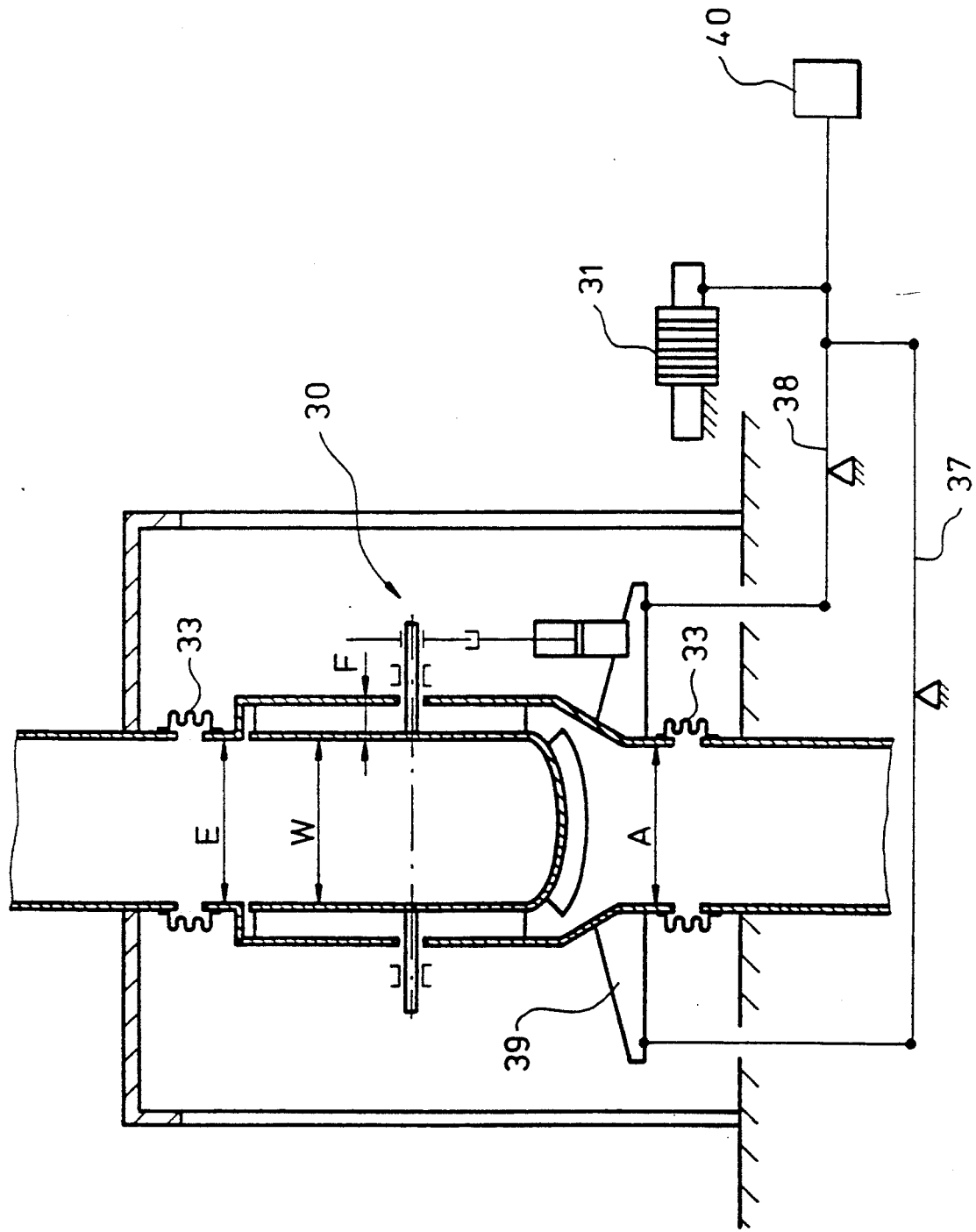
FIG. 5 shows another embodiment form with compensating weight for the weighing unit.

A basic construction which is identical, per se, to that of FIG. 4 is shown in FIG. 5, but comprises a weighing receptacle 2 for very small weighing of e.g. under 5 and under 1 kg per weighing, respectively. The weighing unit 30 is supported on a lever mechanism 37, 38 via brackets 39. The entire tare weight of the weighing unit 30 is compensated for by a compensating weight 40. The weight signal, which is indicated by the weight measuring element 31, is accordingly only the respective scale contents. Since all 3 cross sections E, W and A also conform to one another in this case as in FIG. 4, there are also no disturbing air pressures.

While the foregoing description and drawings represent the preferred embodiments of the present invention, it will be obvious to those skilled in the art that various changes and modifications may be made therein without departing from the true spirit and scope of the present invention.

I claim:

1. Rotary receptacle scale comprising: a casing:
   a cup-shaped weighing receptacle and mechanical positive guidance means for moving the weighing receptacle in the casing from a filling position into an emptying position, said weighing receptacle and said casing being constructed as a rotary lock analogous to the lock rotor and lock wheel housing, wherein the weighing receptacle has a horizontal axis of rotation;
   said weighing receptacle having a base and an opening area both with a rotationally cylindrical shape with reference to the center of rotation of an axle.

2. A rotary receptacle scale according to claim 1, wherein the weighing receptacle includes lateral defining walls, which are constructed at a distance parallel to lateral walls of casing.

3. A rotary receptacle scale according to claim 1, wherein said weighing receptacle has a cylindrical shape.

4. A rotary receptacle scale according to claim 1, wherein said mechanical positive guidance means comprises a drive for rotating said weighing receptacle by 180°.

5. A rotary receptacle scale according to claim 1, wherein the casing of the housing is constructed so as to be resistant to pressure.

6. A rotary receptacle scale according to claim 1, wherein a wiper is arranged in an area of a rounded outer side of the base of the weighing vessel.

7. A rotary receptacle scale according to claim 1, wherein the weighing receptacle is suspended at the weight measuring elements with the casing.

8. A rotary receptacle scale according to claim 1, wherein the tare weight of the weighing receptacle and casing is assigned via a lever mechanism of a compensating weight.

9. A rotary receptacle scale according to claim 1 wherein the casing is constructed to have flange faces having the same dimensions at the top and the bottom.

10. A rotary receptacle scale comprising: a casing; a cup-shaped weighing receptacle and mechanical positive guidance means for moving the weighing receptacle in the casing from a filling position into an emptying position, said weighing receptacle and said casing being constructed as a rotary lock analogous to a lock rotor and lock wheel housing, wherein the weighing receptacle has a horizontal axis of rotation, wherein a wiper is arranged at the weighing receptacle on two lateral wall portions thereof.

* * * * *